United States Patent [19]

Okawa et al.

[11] Patent Number: 5,801,112
[45] Date of Patent: Sep. 1, 1998

[54] DIELECTRIC CERAMIC COMPOSITION

[75] Inventors: Yoshihiro Okawa; Tatsuji Furuse, both of Kokubu, Japan

[73] Assignee: Kyocera Corporation, Kyoto, Japan

[21] Appl. No.: 874,390

[22] Filed: Jun. 13, 1997

[30] Foreign Application Priority Data

Jun. 14, 1996 [JP] Japan .................. 8-153929
Sep. 25, 1996 [JP] Japan .................. 8-252980

[51] Int. Cl.$^6$ .................................. C04B 35/468
[52] U.S. Cl. .......................... 501/138; 501/137
[58] Field of Search ........................ 501/137, 138

[56] References Cited

U.S. PATENT DOCUMENTS 4,739,544  4/1988  Okazaki et al. ............... 501/137
4,987,107  1/1991  Narumi et al. ................. 501/138
5,296,424  3/1994  Wang et al. .................... 501/138

FOREIGN PATENT DOCUMENTS 5769607  4/1982  Japan .
6110806  1/1986  Japan .

*Primary Examiner*—Deborah Jones
*Attorney, Agent, or Firm*—Loeb & Loeb LLP

[57] ABSTRACT

A dielectric ceramic composition being characterized in that the composition contains at least Ba and Ti as metal elements, and when the formula of the composition in accordance with the mole ratios of these elements is represented by $BaO \cdot xTiO_2$, the composition contains the main ingredient determined by x satisfying the relationship of $3.9 \leq x \leq 4.1$, and 0.01 to 7 weight parts of Cu in terms of CuO, and, if necessary, 20 or less weight parts of Zn in terms of ZnO with respect to 100 weight parts of the main ingredient, whereby the dielectric coefficient can have a value in the range of 30 to 42, and Qf can have a value of 40000 GHz or more, the temperature coefficient $\tau_f$ of the resonance frequency can have a value in the range of −15 to +15 ppm/°C., and the temperature drift $\Delta\tau_f$ of the temperature coefficient $\tau_f$ of the resonance frequency can have a value in the range of −2 to +2 ppm/°C.

4 Claims, No Drawings

DIELECTRIC CERAMIC COMPOSITION

SPECIFICATION

Dielectric Ceramic Composition

The present invention relates to a dielectric ceramic composition having a high Q value in the high frequency ranges of microwave, millimeter wave, etc., and more particularly to a dielectric ceramic composition capable of being used for a variety of resonator materials, MIC dielectric substrate materials, dielectric waveguide materials, multilayer ceramic capacitors, etc. used in the high frequency ranges of microwave, millimeter wave, etc.

PRIOR ART

Dielectric ceramics has been utilized extensively for dielectric resonators, MIC dielectric substrates, waveguides, etc. used in the high frequency ranges of microwave, millimeter wave, etc.

Regarding this kind of dielectric ceramics, Japanese Patent Publication 57-69607, for example, discloses dielectric ceramics wherein 1 to 26 weight parts of ZnO is added to 100 weight parts of composition represented by $BaO \cdot xTiO_2$ ($3.9 \leq x \leq 4.1$).

This kind of dielectric ceramics has a dielectric coefficient $\epsilon_r$ of 30 to 40, and a Q value of about 4500 at a measurement frequency f=3.5 GHz, that is, Qf =15750 GHz, and can control the temperature coefficient $\tau_f$ of the resonance frequency in the range of −25 to +25 ppm/°C.

However, in the dielectric ceramics disclosed in the above-mentioned Japanese Patent Publication 57-69607, Qf still has a low value of about 15750 GHz, and the curve of the temperature coefficient $\tau_f$ due to the temperature change, i.e. the temperature drift of the temperature coefficient $\tau_f$ of the resonance frequency is large.

To solve these problems, Japanese Patent Publication 61-10806 has disclosed a dielectric ceramic composition wherein about 1 to 25 weight parts of ZnO and about 1.5 to 6 weight parts of $Ta_2O_5$ are added to and mixed with 100 weight parts of a composition represented by general formula $BaTi_4O_9$. In this ceramic composition, $\Delta \tau_f$ representing temperature drift is controlled to have a nearly zero value. At this time, dielectric loss tanδ at a measurement frequency of 13 GHz is in the range of 3.65 to 3.86×10⁻⁴ (Qf: 33700 to 36000).

These days, working frequencies become higher, and various characteristics depending on temperature change are required to be controlled highly accurately. However, in the dielectric ceramic composition disclosed in Japanese Patent Publication 61-10806, Qf still has a low value of 33700 to 36000 when the temperature drift ($\Delta \tau_f$) is controlled to have a nearly zero value.

An object of the present invention is to provide a dielectric ceramic composition wherein the temperature drift of the temperature coefficient of $BaO \cdot TiO_2$ based dielectric ceramics with respect to frequency is controlled to be nearly 0 ppm/°C., and Qf is increased when the temperature drift $\Delta \tau_f$ is zero.

SUMMARY OF THE INVENTION

In the present invention, by adding a predetermined amount of Cu and, if necessary, a predetermined amount of Zn to a Ba-Ti based dielectric ceramic composition, Qf has a high value of 40000 GHz or more, and the temperature drift $\Delta \tau_f$ of the temperature coefficient $\tau_f$ of the resonance frequency is controlled to be nearly 0 ppm/°C., whereby Qf is increased when the temperature drift is 0 ppm/°C.

In other words, the dielectric ceramic composition of the present invention is characterized in that the composition contains at least Ba and Ti as metal elements, and when the formula of the composition in accordance with the mole ratios of these elements is represented by $BaO \cdot xTiO_2$, the composition contains the main ingredient determined by x satisfying the relationship of $3.9 \leq x \leq 4.1$, and 0.01 to 7 weight parts of Cu in terms of CuO with respect to 100 weight parts of the main ingredient.

Furthermore, by adding Zn together with Cu, Qf can be increased, and the temperature coefficient $\tau_f$ of the resonance frequency can be shifted from the plus side to the minus side.

Moreover, in the Cu containing Ba-Ti based dielectric ceramic composition of the present invention, part of Ba of the main ingredient comprising $BaO \cdot xTiO_2$ is replaced with Sr. When the above-mentioned composition formula is represented by $(Ba_{1-a}Sr_a)O \cdot xTiO_2$, the Sr replacement ratio a is set to satisfy the relationship of $a \leq 0.08$, whereby Qf is increased further, and when the temperature drift $\Delta \tau_f$ of the temperature coefficient is controlled to nearly zero, Qf can have a value of 41000 GHz or more, in particular a high value of about 52000 GHz.

In other words, the dielectric ceramic composition of the present invention is characterized in that the composition contains at least Ba and Ti as metal elements, and when the formula of the composition in accordance with the mole ratios of the metal oxides of these elements is represented by $(Ba_{1-a}Sr_a)O \cdot xTiO_2$, the composition contains the main ingredient determined by x and a satisfying the relationship of $3.9 \leq x \leq 4.1$ and $a \leq 0.08$, in particular $0.01 \leq a \leq 0.08$, and 0.01 to 7 weight parts of Cu in terms of CuO with respect to 100 weight parts of the main ingredient.

By replacing part of Ba with Sr, Qf can be increased to 42000 GHz or more, crystal grains can be prevented from being coarsened during firing, whereby the reduction resistance of the ceramics in high temperature can be improved and the decrease of Qf due to the upsizing of ceramics can be prevented. Besides, since the ion radius of Sr differs from that of Ba, lattice strain generates when part of Ba is replaced with Sr, whereby the strength of the ceramics can be increased.

EMBODIMENT

In a first embodiment of the present invention, a predetermined amount of Cu and, if necessary, a predetermined amount of Zn are added to a Ba-Ti based dielectric ceramic composition.

When the formula of the composition of the main ingredient in accordance with mole ratios is represented by $BaO \cdot xTiO_2$, x is set in the range of $3.9 \leq x \leq 4.1$ to increase Qf. If x is less than 3.9, Qf is not increased effectively, and if x is more than 4.1, Qf is lowered. It is desirable that x is 3.92 or more and 4.08 or less in order not to decrease Qf.

0.01 to 7 weight parts of Cu in terms of CuO is contained with respect to 100 weight parts of the main ingredient. If the amount of Cu in terms of CuO is less than 0.01 weight parts or more than 7 weight parts, the temperature drift $\Delta \tau_f$ of the temperature coefficient $\tau_f$ of the resonance frequency is outside the range of −2 to 2 ppm/°C. This is impractical. It is desirable that 0.1 to 5 weight parts of Cu in terms of CuO is contained with respect to 100 weight parts of the main ingredient in order to set $\Delta \tau_f$ at nearly zero.

Furthermore, 20 or less weight parts of Zn in terms of ZnO is contained with respect to 100 weight parts of the main ingredient. If the amount of Zn is more than 20 weight parts, the temperature coefficient $\tau_f$ of the resonance frequency is less than −15 ppm/°C. This is impractical. It is desirable that the amount of Zn is 15 or less weight parts with respect to 100 weight parts of the main ingredient in order to set the temperature coefficient $\tau_f$ at nearly zero.

As described above, in the composition formula for the main ingredient of the dielectric ceramic composition of the present invention, it is desirable that x satisfies the relationship of $3.92 \leq x \leq 4.08$, that the amount of Zn is 15 or less weight parts in terms of ZnO, and that the amount of Cu is in the range of 0.1 to 5 weight parts in terms of CuO with respect to 100 weight parts of the main ingredient.

In this case, control is made possible to set Qf at 42000 GHz or more, the temperature coefficient $\tau_f$ of the resonance frequency in the range of −6 to +10 ppm/°C., the temperature drift $\alpha\tau_f$ of the temperature coefficient $\tau_f$ of the resonance frequency in the range of −1 to +1 ppm/°C., and Qf at 44000 MHz or more when $\Delta\tau_f$ is nearly 0 ppm/°C.

For the second embodiment, when the formula of the composition is represented by $(Ba_{1-a}Sr_a)O \cdot xTiO_2$ in accordance with mole ratios, Sr replacement ratio a is set to satisfy the relationship of $0.01 \leq a \leq 0.08$, since Qf can be increased significantly and the strength of the ceramics can be increased by replacing part of Ba with Sr. If the Sr replacement ratio a is less than 0.01, Qf is not increased effectively, and the mechanical strength of the ceramics is less increased. On the other hand, if a is more than 0.08, the amount of Sr exceeds solid solubility limit of Sr in the main ingredient, the crystal phases including precipitate particles containing Sr, and Qf is lowered. It is thus desirable that the ratio a is in the range of 0.01 to 0.05 in order to increase Qf and the mechanical strength.

In the above-mentioned composition formula, x is set to satisfy the relationship of $3.9 \leq x \leq 4.1$, since Qf can be retained high in this range. If x is less than 3.9 or more than 4.1, Qf is lowered. It is thus desirable that x is 3.95 or more and 4.05 or less in order to increase Qf.

Furthermore, 0.01 to 7 weight parts of Cu in terms of CuO is contained with respect to 100 weight parts of the main ingredient because of the following reasons. If Cu is less than 0.01 or more than 7 weight parts in terms of CuO, the temperature drift of the temperature coefficient $\tau_f$ of the resonance frequency becomes more than 2 ppm/°C. This is impractical. It is thus desirable that 0.1 to 5.0 weight parts of Cu in terms of CuO is contained with respect to 100 weight parts of the main ingredient in order to set the temperature drift of the temperature coefficient $\tau_f$ at nearly zero.

Moreover, in the present invention, it is desirable that 18 or less weight parts of Zn in terms of ZnO is contained with respect to 100 weight parts of the main ingredient. If the amount of Zn is more than 18 weight parts, the temperature coefficient $\tau_f$ of the resonance frequency becomes less than −20 ppm/°C. This is impractical. It is thus desirable that 4 to 18 weight parts, more particularly 8.7 to 13.9 weight parts of Zn in terms of ZnO is contained with respect to 100 weight parts of the main ingredient in order to set the temperature drift $\Delta\tau_f$ of the temperature coefficient $r_f$ of the resonance frequency at nearly zero.

In accordance with the above-mentioned composition formula of the dielectric ceramic composition of the present invention, it is desirable that the ratio a satisfies the relationship of $0.01 \leq a \leq 0.05$, that x satisfies the relationship of $3.95 \leq x \leq 4.05$, that the amount of Zn is in the range of 8.7 to 13.9 weight parts in terms of ZnO, and that the amount of Cu is in the range of 0.1 to 5.0 weight parts in terms of CuO with respect to 100 weight parts of the main ingredient. In this case, control can be made to set Qf at 49000 GHz or more, the temperature coefficient $\tau_f$ of the resonance frequency in the range of −12 to +5 ppm/°C., the temperature drift of the temperature coefficient $\tau_f$ in the range of −1.0 to +2.0 ppm/°C. When the temperature drift $\Delta\tau_f$ of the temperature coefficient $\tau_f$ of the resonance frequency is nearly zero, Qf can be set at 49000 GHz or more, in particular about 55000 GHz.

In the above-mentioned dielectric ceramic composition of the present invention, the crystal phase of $BaTi_4O_9$ is present as a main crystal phase. When Zn is included, the crystal phase of $Ba_3Ti_{12}Zn_7O_{34}$ is evenly dispersed in the ceramics. Slight amounts of other crystals may be precipitated. When part of Ba is replaced with Sr, it is desirable that Sr is dissolved in the crystal phases of $BaTi_4O_9$ and $Ba_3Ti_{12}Zn_7O_{34}$. The dissolved Sr is replaced with part of Ba in the crystal phases of $BaTi_4O_9$ and $Ba_3Ti_{12}Zn_7O_{34}$. In the present invention, by precipitating the crystal phase of $Ba_3Ti_{12}Zn_7O_{34}$ owing to containing Zn, Qf can be increased, and the temperature coefficient $\tau_f$ can be shifted from the plus side to the minus side. The presence of the crystal phases can be recognized by X-ray diffraction analysis In the Ba-Ti based dielectric ceramic composition of the present invention represented by $(Ba_{1-a}Sr_a)O \cdot xTiO_2$, part of Ba is replaced with Sr, and a predetermined amount of Cu or predetermined amounts of Cu and Zn are contained. With this composition, the dielectric coefficient is in the range of 30 to 40, and Qf is 41000 GHz or more. In the temperature range of −40° to 85° C., the temperature coefficient $\tau_f$ of the resonance frequency can be controlled to have a value in the range of −20 to +20 ppm/°C., and the temperature drift of the temperature coefficient $\tau_f$ of the resonance frequency can be controlled to have a value in the range of −2 to +2 ppm/°C. When the temperature drift $\Delta\tau_f$ is nearly zero, Qf can be set at 42000 or more, in particular about 52000.

Furthermore, Qf can be increased by containing Zn, and the temperature coefficient $\tau_f$ of resolution frequency can be shifted from the plus side to the minus side.

The dielectric ceramic composition of the present invention can be obtained by taking the following steps. Powders of $BaCO_3$, $TiO_2$, CuO and, if necessary, $SrCO_3$ and ZnO are prepared as material powders, for example. These are weighed so that a sintered substance of these can have the above-mentioned composition ratios. The powders are crushed and mixed by using a zirconia bowl, for example. The mixed powder is calcinated, and then crushed and mixed again by using the zirconia bowl. The calcinated powder is formed into a predetermined shape by a known method, such as the press forming method or doctor blade method, and fired for 1 to 10 hours at 950° to 1200° C. in the atmosphere or in an atmosphere of oxygen.

Metal salts, such as hydroxides, carbonates and nitrates, which form oxides when fired can also be used as material powders. The dielectric ceramics of the present invention may inevitably contain impurities, such as Al, Si, Ca, Mg, Fe, Hf and Sn. CuO may be added after calcination.

When part of Ba is replaced with Sr in the dielectric ceramic composition of the present invention, it is necessary to perform calcination for 1 hour or more at a temperature in the range of 950° to 1200° C. so that the crystal phase of $Ba_3Ti_{12}Zn_7O_{34}$ can be evenly dispersed in the crystal phase of $BaTi_4O_9$ and so that Sr can be dissolved in the crystal phases of $BaTi_4O_9$ and $Ba_3Ti_{12}Zn_7O_{34}$. This is because the crystal phase of $Ba_3Ti_{12}Zn_7O_{34}$ is hardly formed if calcination is performed for less than 1 hour at a low temperature of less than 1050° C.

EXAMPLE 1

Powders of $BaCO_3$, $TiO_2$, ZnO and CuO having a purity of 99% or more are used as materials, and weighed so that x in the composition formula of the main ingredient, and the amounts of Cu and Zn have the ratios listed in TABLE 1. These were mixed in a bowl mill comprising a zirconia bowl in a wet condition for 20 hours by using pure water as a medium. The amounts of Cu and Zn listed in TABLE 1 correspond to the amounts obtained in terms of CuO and ZnO. This mixture was then dried (dehydrated) and calcinated for 3 hours at 1050° C. The calcinated substance was crushed, mixed with binder and press-formed into a cylinder form having a diameter of 12 mm and a height of 6.5 mm at a pressure of 1 ton/cm² to obtain samples for evaluating dielectric characteristics. The cylinder form was fired for 2 hours at 950° to 1200° in an atmosphere of oxygen to obtain samples measuring a diameter of 10 mm and a height of 5.5 mm.

To evaluate the dielectric characteristics, the dielectric coefficient and Q at a frequency of 6 GHz were measured by the dielectric cylinder resonator method using the above-mentioned samples. The product of Q and measurement frequency f is listed in TABLE 1. In addition, the resonance frequencies in the temperature range of -40° to 85° C. were measured, and the temperature coefficients $\pi_f$ of the resonance frequency were calculated on the basis of the resonance frequency at 25° C.

$\pi_{f1}$ in TABLE 1 represents the temperature coefficient of the resonance frequency at -40° C., and $\pi_{f2}$ represents the temperature coefficient of the resonance frequency at 85° C. $\pi_{f1}$ was calculated on the basis of $$\pi_{f1} = \{(f_{-40} - f_{25})/f_{25}\}/65 \times 10^6 [ppm/°C.]$$

and $\pi_{f2}$ was calculated on the basis of $$\pi_{f2} = \{(f_{85} - f_{25})/f_{25}\}/60 \times 10^6 [ppm/°C.]$$

$f_{-40}$ represents a resonance frequency at -40°C., $f_{85}$ represents a resonance frequency at 85° C., and $f_{25}$ represents a resonance frequency at 25° C. The temperature drift $\Delta\pi_f$ of the temperature coefficient of the resonance frequency is obtained from the equation of $\Delta\pi_f = \pi_{f1} - \pi_{f2}$. The results were listed in TABLE 1.

According to TABLE 1, in the dielectric ceramic composition of the present invention (Sample Nos. 1 to 15, 18), it is found that the dielectric coefficient $\epsilon_r$ can have a value of 33 or more, and that Qf can have a value of 40000 GHz or more. In particular, when the amount of Zn is 20 or less weight parts (Sample Nos. 1 to 15), it is found that the temperature coefficient $\pi_f$ of the resonance frequency and the temperature drift $\Delta\pi_f$ of the temperature coefficient $\pi_f$ of the resonance frequency have surpassing characteristics, i.e., they are in the range of -15 to +15 ppm/°C. and in the range of -2 to +2 ppm/°C., respectively. Furthermore, it is found that Qf can have a high value of 43000 GHz or more when the temperature drift $\Delta\pi_f$ of the temperature coefficient of the resonance frequency is nearly zero.

TABLE 1

| Sample No. | Main ingredient x | Cu Wt parts | Zn Wt parts | Dielectric coefficient $\epsilon_r$ | Qf 6-7 Hz (GHz) | Temperature coefficient $\tau_f$ (ppm/°C.) $\tau_{f1}$ | $\tau_{f2}$ | $\Delta\tau_f$ |
|---|---|---|---|---|---|---|---|---|
| 1 | 3.90 | 1 | 5 | 34.0 | 41000 | +7.0 | +5.0 | +2.0 |
| 2 | 3.92 | 2 | 10 | 35.5 | 44000 | -3.7 | -4.2 | +0.5 |
| 3 | 3.94 | 3 | 15 | 37.8 | 45000 | -13.0 | -13.1 | +0.1 |
| 4 | 3.96 | 4 | 20 | 38.7 | 47000 | -14.1 | -13.6 | -0.5 |
| 5 | 3.98 | 0.1 | 10 | 35.9 | 49000 | -2.5 | -4.3 | +1.8 |
| 6 | 4.00 | 0.01 | 0 | 36.3 | 52000 | +15.0 | +13.1 | +1.9 |
| 7 | 4.02 | 5 | 5 | 39.3 | 44000 | +5.5 | +7.1 | -1.6 |
| 8 | 4.04 | 6 | 20 | 39.6 | 42000 | -15.0 | -13.2 | -1.8 |
| 9 | 4.06 | 7 | 15 | 39.9 | 40000 | -14.3 | -12.3 | -2.0 |
| 10 | 4.08 | 3 | 10 | 36.8 | 42000 | -3.5 | -3.5 | 0.0 |
| 11 | 4.10 | 2 | 5 | 36.5 | 40000 | +5.1 | +4.9 | +0.2 |
| 12 | 4.00 | 1 | 5 | 36.5 | 48000 | +7.0 | +5.2 | +1.8 |
| 13 | 4.00 | 3 | 7 | 37.0 | 49000 | 0.0 | 0.0 | 0.0 |
| 14 | 4.00 | 5 | 15 | 39.3 | 42000 | -14.3 | -12.5 | -1.8 |
| 15 | 4.00 | 7 | 20 | 41.8 | 40000 | -14.9 | -12.9 | -2.0 |
| *16 | 3.84 | 3 | 10 | 37.1 | 33000 | -3.4 | -3.8 | +0.4 |
| *17 | 4.16 | 3 | 10 | 36.6 | 33000 | -3.2 | -3.6 | +0.4 |
| 18 | 4.00 | 3 | 25 | 36.1 | 41000 | -30.5 | -27.2 | -3.3 |
| *19 | 4.00 | 0.005 | 10 | 36.0 | 50000 | -2.5 | -5.0 | +2.5 |
| *20 | 4.00 | 9 | 10 | 39.3 | 17000 | -3.8 | +1.4 | -5.2 |

*: comparative examples

EXAMPLE 2

Powders of $BaCO_3$, $TiO_2$, $SrCO_3$, ZnO and CuO having a purity of 99% or more are used as materials, and weighed so that the values a and x in the above-mentioned composition formula, and the amounts of Cu and Zn have the ratios listed in TABLE 1. These were mixed in a bowl mill comprising a zirconia bowl in a wet condition for 20 hours by using pure water as a medium. This mixture was then dried (dehydrated) and calcinated for 6 hours at 1100° C. The calcinated substance was crushed, and press-formed into a cylinder form having a diameter of 10 mm and a height of 8 mm at a pressure of 1 ton/cm² to obtain samples for evaluating dielectric characteristics. The cylinder form was fired for 2 hours at temperatures listed in TABLE 2 in the atmosphere to obtain samples measuring a diameter of 8 mm and a height of 6 mm.

The methods of the test and evaluation are the same as those for EXAMPLE 1. The test results are listed in TABLE 2.

TABLE 2

| Sample No. | Main ingredient x | Main ingredient a | Cu Wt parts | Zn Wt parts | Firing temperature °C. | $\epsilon_r$ | Qf (GHz) | Temperature coefficient $\tau_f$ [ppm/°C.] $\tau_{f1}$ | $\tau_{f2}$ | $\Delta\tau_f$ |
|---|---|---|---|---|---|---|---|---|---|---|
| *21 | 3.80 | 0.04 | 3.0 | 9.2 | 1150 | 38.0 | 38000 | 10.5 | 9.3 | 1.2 |
| 22 | 3.90 | 0.04 | 3.0 | 9.2 | 1150 | 37.1 | 42900 | 2.1 | 1.6 | 0.5 |
| 23 | 3.95 | 0.04 | 3.0 | 9.2 | 1150 | 37.0 | 42353 | 0.4 | 0.4 | 0.0 |
| 24 | 4.00 | 0.03 | 3.0 | — | 1150 | 38.6 | 43000 | 10.1 | 9.7 | 0.4 |
| 25 | 4.00 | 0.03 | 3.0 | 4.0 | 1150 | 38.0 | 49005 | 6.4 | 5.5 | 0.9 |
| 26 | 4.00 | 0.03 | 3.0 | 5.3 | 1150 | 38.5 | 49780 | 4.1 | 3.5 | 0.6 |
| 27 | 4.00 | 0.03 | 3.0 | 10.4 | 1150 | 37.2 | 52500 | −5.6 | −5.4 | −0.2 |
| 28 | 4.00 | 0.03 | 3.0 | 13.9 | 1150 | 36.3 | 54501 | −11.8 | −11.9 | 0.1 |
| 29 | 4.00 | 0.03 | 3.0 | 18.0 | 1150 | 35.4 | 56444 | −20.0 | −18.7 | −1.3 |
| 30 | 4.00 | 0.04 | 3.0 | 10.4 | 1150 | 36.8 | 50071 | −5.2 | −5.0 | −0.2 |
| 31 | 4.00 | 0.05 | 3.0 | 10.4 | 1150 | 37.6 | 49362 | −5.0 | −4.8 | −0.2 |
| 32 | 4.00 | 0.06 | 3.0 | 10.4 | 1150 | 37.6 | 47469 | −4.9 | −4.8 | −0.1 |
| 33 | 4.00 | 0.08 | 3.0 | 10.4 | 1150 | 38.9 | 43249 | −4.5 | −4.4 | −0.1 |
| *34 | 4.00 | 0.10 | 3.0 | 10.4 | 1150 | 39.3 | 29565 | 49.9 | 45.2 | 4.7 |
| 35 | 4.05 | 0.02 | 3.0 | 10.4 | 1150 | 37.4 | 51862 | −4.1 | −4.1 | 0.0 |
| 36 | 4.05 | 0.02 | 3.0 | 13.8 | 1150 | 36.5 | 52042 | −10.8 | −11.0 | 0.2 |
| 37 | 4.07 | — | 3.0 | 10.3 | 1150 | 35.5 | 39000 | −2.3 | −2.6 | 0.3 |
| 38 | 4.07 | 0.01 | 3.0 | 10.3 | 1150 | 36.9 | 46045 | −2.1 | −2.5 | 0.4 |
| 39 | 4.07 | 0.02 | 3.0 | 10.3 | 1150 | 37.0 | 45440 | −2.0 | −2.4 | 0.4 |
| 40 | 4.10 | 0.02 | 3.0 | 10.3 | 1150 | 36.7 | 41399 | −0.4 | −0.4 | 0.0 |
| *41 | 4.15 | 0.02 | 3.0 | 10.1 | 1150 | 37.5 | 26382 | 2.1 | 1.6 | 0.5 |
| *42 | 4.00 | 0.03 | 0.005 | 8.7 | 1250 | 35.6 | 50032 | 4.4 | 2.0 | 2.4 |
| 43 | 4.00 | 0.03 | 0.01 | 8.7 | 1200 | 35.8 | 51734 | 4.0 | 2.1 | 1.9 |
| 44 | 4.00 | 0.03 | 0.1 | 8.7 | 1200 | 35.7 | 51766 | 4.2 | 2.4 | 1.8 |
| 45 | 4.00 | 0.03 | 1.0 | 8.7 | 1180 | 36.3 | 52000 | 2.1 | 1.1 | 1.0 |
| 46 | 4.00 | 0.03 | 3.0 | 8.7 | 1150 | 37.6 | 51800 | −2.5 | −3.2 | 0.7 |
| 47 | 4.00 | 0.03 | 5.0 | 8.7 | 1150 | 38.9 | 51513 | −7.2 | −6.5 | −0.7 |
| 48 | 4.00 | 0.03 | 7.0 | 8.7 | 1150 | 40.3 | 51227 | −11.8 | −9.8 | −2.0 |
| *49 | 4.00 | 0.03 | 9.0 | 8.7 | 1150 | 41.6 | 51940 | −16.5 | −13.2 | −3.3 |

*: samples beyond the scope of the present invention

According to TABLE 2, in the samples of the present invention, it is found that the dielectric coefficient $\epsilon_r$ can have a value of 35 or more, and that Qf can have a value of 41000 GHz or more. It is also found that the temperature coefficient $\tau_f$ of the resonance frequency and the temperature drift $\Delta\tau_f$ of the temperature coefficient $\tau_f$ of the resonance frequency have surpassing characteristics, i.e., they are in the range of −20 to +20 ppm/°C. and in the range of −2 to +2 ppm/°C., respectively. Furthermore, when the temperature drift $\Delta\tau_f$ of the temperature coefficient of the resonance frequency is nearly zero, it is found that Qf can have a high value of 43000 GHz or more, in particular about 55000 GHz.

The samples of the present invention excluding sample No. 24 contain the crystal phases of $BaTi_4O_9$ and $Ba_3Ti_{12}Zn_7O_{34}$. It was confirmed that Sr was dissolved by the analysis of these crystal phases using an X-ray microanalyzer (EPMA).

According to the results for samples No. 24 to 29, it is found that as the amount of Zn increases, Qf increases, the temperature coefficient $\tau_f$ of the resonance frequency can be shifted to the minus side, and $\Delta\tau_f$ can approach zero.

Furthermore, according to the results for samples 42 to 49, it is found that Qf values of the samples containing the amount of Cu within the scope of the present invention are higher than those of samples beyond the scope of the present invention, the temperature coefficient $\tau_f$ of the resonance frequency can be shifted to the minus side, and $\Delta\tau_f$ can approach zero.

As detailed above, the dielectric ceramic composition of the present invention is characterized in that the composition contains at least Ba and Ti as metal elements, and when the formula of the composition in accordance with the mole ratios of these elements is represented by $BaO.xTiO_2$, the composition contains main ingredient determined by x satisfying the relationship of $3.9 \leq x \leq 4.1$, 0.01 to 7 weight parts of Cu in terms of CuO, and, if necessary, 20 or less weight parts of Zn in terms of ZnO with respect to 100 weight parts of the main ingredient, whereby the dielectric coefficient can have a value in the range of 30 to 42, and Qf can have a value of 40000 GHz or more. The temperature coefficient $\tau_f$ of the resonance frequency can have a value in the range of −15 to +15 ppm/°C, and the temperature drift $\Delta\tau_f$ of the temperature coefficient $\tau_f$ of the resonance frequency can have a value in the range of −2 to +2 ppm/°C. Furthermore, Qf can have a high value of 40000 GHz or more when the temperature drift $\Delta\tau_f$ of the temperature coefficient of the resonance frequency is nearly zero, thereby capable of increasing the strength of the ceramics.

Additionally, part of Ba in the Ba-Ti based dielectric ceramic composition of the present invention is replaced with Sr, and a predetermined amount of Cu or predetermined amounts of Cu and Zn are contained, whereby the dielectric coefficient can be in the range of 30 to 40, and Qf can have a value of 41000 GHz or more, the temperature coefficient $\tau_f$ of the resonance frequency can have a value in the range of −20 to +20 ppm/°C, and the temperature drift $\Delta\tau_f$ of the temperature coefficient $\tau_f$ of the resonance frequency can have a value in the range of −2 to +2 ppm/°C. Furthermore, Qf can have a value of 41000 GHz or more when the temperature drift $\Delta\tau_f$ of the temperature coefficient of the resonance frequency is nearly zero, thereby capable of further increasing the strength of the ceramics.

Accordingly, the dielectric ceramic composition of the present invention can be ideally suited for a variety of resonator materials, MIC dielectric substrate materials, dielectric waveguide materials, etc. used in the high frequency ranges of microwave, millimeter wave, etc.

We claim:

1. A dielectric ceramic composition comprising Ba and Ti as main ingredient, said composition represented by $$BaO.xTiO_2,$$

wherein $3.9 \leq x \leq 4.1$, and 0.01 to 7 weight parts of Cu in terms of CuO with respect to 100 weight parts of said main ingredient.

2. A dielectric ceramic composition according to claim 1, further comprising 20 or less weight parts of Zn in terms of ZnO with respect to 100 weight parts of said main ingredient.

3. A dielectric ceramic composition according to claim 1 wherein part of Ba of said main ingredient is replaced with Sr, and the formula of said composition is represented by $$(Ba_{1-a}Sr_a)O.xTiO_2,$$

wherein $a \leq 0.8$.

4. A dielectric ceramic composition according to claim 3, wherein $0.01 \leq a$.

* * * * *